Oct. 21, 1958 G. L. SCHNABLE ET AL 2,857,560

SEMICONDUCTOR UNIT AND METHOD OF MAKING IT

Filed Dec. 20, 1955

INVENTORS
GEORGE L. SCHNABLE
MEIER SADOWSKY
BY
Carl H. Lynnestvedt
AGENT

United States Patent Office 2,857,560

Patented Oct. 21, 1958

2,857,560

SEMICONDUCTOR UNIT AND METHOD OF MAKING IT

George L. Schnable, Lansdale, and Meier Sadowsky, Elkins Park, Pa., assignors to Philco Corporation, Philadelphia, Pa., a corporation of Pennsylvania Application December 20, 1955, Serial No. 554,194

19 Claims. (Cl. 317—235)

This invention relates to methods of and means for plastic encapsulation, or so-called "potting," of semiconductor devices, such as diodes or transistors. Potted semiconductors have a number of important advantages, including stability of operating characteristics during life of the device, capability of withstanding severe shock without deleterious effects, and susceptibility of production in quantity while preserving uniformity and predictability of operation. Particularly, the potting technique—as has been demonstrated by much use of the same by applicants' assignee—minimizes the possibility of contamination of the transistor device during use, and maintains required standards of electrical insulation.

In accordance with such technique the components of a semiconductor device are rigidly held in a predetermined critical relationship by embedding said device in a so-called plastic material such, for example, as a synthetic resin comprising a high-polymer product, this material being sealed within a metal shield, or "can."

For certain types of use to which the semiconductor device may be put it is important to insure maximum dissipation of heat generated in the device and more particularly dissipation of such heat by transfer thereof through the potting material. With this requirement in mind, it is the primary object of the present invention to effect a substantial improvement in the transfer of heat from the semiconductor device through the potting material to the shield member or can in which the latter is encapsulated, and yet to utilize all of the advantageous electrical and mechanical characteristics afforded by potting.

With more particularity, our invention has as an objective the provision of methods of and means for potting semiconductor devices in such manner as to combine the properties of high heat and low electrical conductivity. In accordance with a feature of the invention these objectives are realized by utilizing a new and improved potting mixture, and by providing a novel method of mechanically treating said mixture and the semiconductor device embedded therein.

To the foregoing ends, and first briefly and generally described, our invention, in the method aspect, comprises: providing, in a suitable can, a mixture of plastic material in a fluid state, with heat-conductive filler particles relatively thinly dispersed in said material; inserting the semiconductor device, including its electrode means, into the mixture; then concentrating filler particles of the mixture in a relatively limited region in the can, which region is in contact with such electrode means as well as with the can; and finally converting the material into a substantially solid substance. Viewed in the apparatus aspect, our invention provides a transistor potting structure comprising a relatively solid plastic body in a metal can, one part of the plastic body having a great number of filler particles embedded therein and forming an electrically insulating but thermally transmissive shell connecting the collector electrodes with the can. Another part of the pastic body, free of filler particles, may, at least in certain embodiments of the invention, surround and insulate lead wires of the device; and the metal can may be electrically insulated from the entire semiconductor device, while being thermally connected to heat-generating electrode portions thereof.

Details of the fabrication process and of the unit formed thereby will be understood more clearly upon a study of the description of preferred embodiments, which follows, with reference to the drawing appended hereto, wherein—

Figure 1:
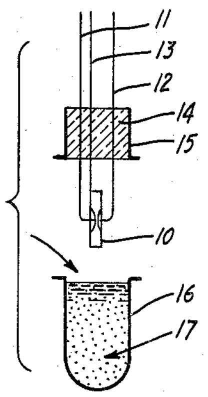
Fig. 1 shows one phase of the fabricating process.

Referring first to Fig. 1, the fabrication starts by providing a semiconductor device, shown as a transistor 10 with collector wire 11, emitter wire 12 and base wire 13, portions of such wires being sealed in a glass bead 14 surrounded by a metal sleeve 15. There is also provided a metal can 16 containing a body 17 of a certain type of plastic material in fluid condition, that is, in form of a liquid or paste. For example, a low-molecular-weight polyethylene compound may be often used as such a material; in this case the subsequent solidification or curing is a thermoplastic operation. Other examples of thermoplastic materials which may sometimes be used advantageously for the present purposes are: paraffin, polychlorotrifluoroethylene, and polystyrene resin. Examples of thermosetting materials which may be used are: silicone rubber, epoxy resins, and vinyl functional dimethyl silicones. These and some other suitable plastic materials can be generically described as plastics having high specific resistance when cured—in excess of 10 megohm-centimeter—also having high dimensional stability during and after the curing and having relatively little effect and no impairing effect upon the operating characteristics of the semiconductor during their contact with the semiconductor at the curing temperatures of the plastic and at the operating temperatures of the semi-conductor. Another such material, of the thermosetting type, is used by our assignee under the trade name Lanco No. 6.

Figure 2:
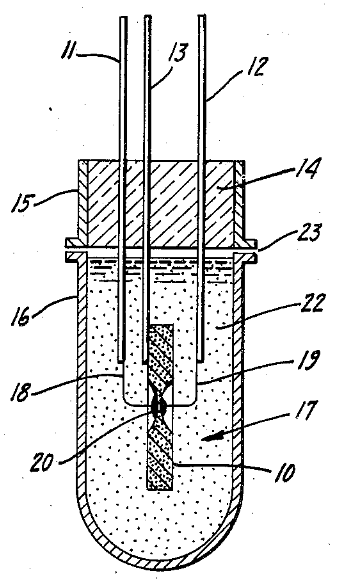
Fig. 2 shows a subsequent phase of this process, on an enlarged scale.

A great number of small filler particles are uniformly and relatively dilutely dispersed in this plastic, as shown by uniformly distributed stippling in the figure under discussion. We have obtained a measure of success with a variety of filler materials, including among others, aluminum oxide, surface-oxidized aluminum, titanium dioxide, silicon dioxide, red lead oxide and zirconium orthosilicate. Best results have been obtained with powdered and surface-oxidized silicon carbide. Advantageously this material is introduced into the fluid plastic in very finely powdered particle state so that the mass of filler particles may intimately contact the surfaces of the semiconductor device. The material then forms a slow-settling or non-settling suspension in the fluid plastic. It must further be provided in such a substantial but limited amount as to appreciably raise the thermal conductivity of the mixture, at least after concentration of the fillers, but still to leave it possible, before such concentration to lower the semi-conductor device into the mixture under suitable temperature conditions, without injury to parts such as the delicate semiconductor body and its "cat whiskers" 18, 19 (Fig. 2). The fluid mixture provided, prior to concentration, will then retain a certain degree of fluidity. It seems to be most advantageous, for the different operations mentioned, if said fillers and plastic are mixed in an approximate ratio ranging between 60 to 40 and 70 to 30, by weight; the exact selection depending on features such as the sizes and shape of the filler particles used. We have obtained particularly good operation when potting a transistor in a mixture of said Lanco No. 6 with surface-oxidized silicon carbide particles having screen sizes between 300 and 500.

Fig. 2 shows the condition of the parts and particles on completion of the transistor inserting and submerging operation; a substantially uniform mixture of fluid plastic and filler particles surrounds the transistor and practically fills the can to the top.

Figure 3:
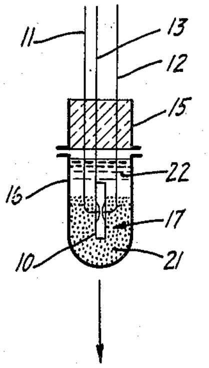
Fig. 3 shows a third phase of this process.

In order to allow good transistor operation, and particularly good heat dissipation, some or all of the filler particles of the original mixture must first be concentrated, in a limited portion 21 of the fluid plastic body 17, that is, removed from another portion 22 of said body. The portion or zone 21 of particle concentration, as shown, contacts and surrounds certain electrodes of the transistor, particularly the collector electrode 20 thereof and desirably also surrounding portions of the semiconductor itself; typical semiconductor materials being better conductors of heat than typical electrode materials are. On the other hand, said zone of particle concentration is contacted and surrounded by an inside surface of the metal can. Thus we establish the condition shown in Fig. 3, wherein, as shown, most or substantially all of the particles are disposed in the lower part 21 of the plastic body 17 and few or substantially none remain in the upper part 22 of said body.

By settling the particles, such concentration has been applied to the filler particles mentioned, in said fluid plastic, in about one week. Substantially the same degree of concentration and the same beneficial results have been achieved by centrifuging the mixture for five minutes, under an acceleration of 20,000 g., the centrifugal force being applied in the direction of the arrow in Fig. 3. Centrifuging is also desirable in many cases, and sometimes even required, in order to test the semiconductor device as to mechanical strength against vibration and shock load; thus the present centrifuging operation causes no added increase in the cost of the equipment required for this process. The concentrating must be performed at a relatively raised temperature if one of the thermoplastic materials is used.

The concentrated arrangement of the filler particles in the plastic is then made permanent, incident to the known operation of converting the plastic into a solid, at temperatures suitable for this purpose. The exact thermoplastic or thermosetting procedures, temperatures, periods, etc. need not be specified herein. In many applications of the present method, the heating up of the entire mixture must also be controlled to avoid overheating of local portions thereof, which would injure the semiconductor or the potting compound, or both. Sometimes the heating must be performed with particular care, in order to avoid redispersion of the concentrated filler particles at the start of the curing operation.

Figure 4:
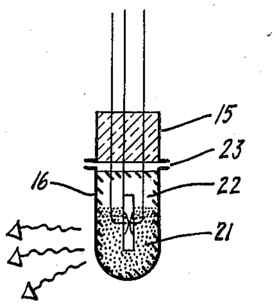
Fig. 4 shows a fourth phase of the fabricating process and a cross section through the completed unit.

Fig. 4 shows the condition of the involved parts and particles after curing. For present purposes this condition may be considered as the final stage of the process, except that it is also necessary to seal the aperture 23 between can 16 and stem 15, which can be done before or after curing, depending on features of no importance for this invention. Thus Fig. 4 also shows the substantially completed unit. Substantially all of the filler particles are embedded in solid plastic in what is shown as the lower part, 21, of the can 16. They form a concentrated mass of plastic-embedded particles in this part, extending directly from the middle and lower portions of the transistor to the can.

This structure allows rapid transmission of large amounts of heat from heat-generating parts of the transistor—particularly from the collector electrode 20 in the middle of the transistor—to the metal of the can 16, and thereby, as suggested by arrows, to ultimate dissipation. A typical embodiment of the new unit, connected to an infinite heat sink to keep the can at room temperature, showed collector temperature rises of only about .005 degree centigrade per milliwatt of collector energy dissipation; whereas an identically constructed and connected transistor unit, potted in an identical plastic but without fillers, showed corresponding temperature rises of about .043 degree; said dissipations ranging up to 700 milliwatt and the starting temperature being 27 degrees centigrade.

The present potting unit also showed advantageously high electrical resistivity and low permeability for contaminants, as well as adequate mechanical, electronic and other characteristics, required for proper semiconductor operation.

While we have described only one basic manner of performing the process and only one basic product thereof, it should be understood that the details thereof are not to be construed as limitative of the invention, except insofar as set forth in the following claims.

We claim:

1. A method of plastic encapsulation of a semiconductor device, comprising the steps of submerging the device, including electrode means thereof, in a can filled with a relatively dilute mixture of fluid plastic material and heat-conductive filler particles; then concentrating substantially all of said particles of the mixture in a relatively limited region in the can, which region is in contact with such electrode means and with the can; and then converting the mixture into a substantially solid substance of low electrical conductivity, thereby permanently locking the concentrated particles in said region.

2. A method as described in claim 1 wherein the concentrating is performed by centrifuging.

3. A method as described in claim 1 wherein the concentrating is performed by settling.

4. In a method of potting a semiconductor device in a can filled with liquid plastic of low electrical conductivity, the steps of first dispersing thermally conductive filler particles throughout the liquid in the can, so as to form a mixture dilute enough to allow insertion of the device into the mixture without damage to the device; then concentrating substantially all of said particles in, and distributing them throughout, a portion of the mixture extending directly from electrode means of the device to the can; and then solidifying the plastic.

5. A method as described in claim 4 wherein the ratio of the dispersed particles to the liquid plastic is in the approximate range between 60:40 and 70:30 by weight.

6. A method as described in claim 4 wherein the limited portion of the mixture, containing the concentrated filler particles, amounts to about one-half of the total volume of the mixture in the can.

7. A method as described in claim 4 wherein the filler particles substantially consist of silicon carbide.

8. A method as described in claim 7 wherein the filler particles have screen sizes between about 300 and 500.

9. A method as described in claim 4 wherein the plastic has high dimensional stability during the solidifying operation.

10. A method as described in claim 4 wherein the plastic is of a type having no impairing effect upon the operating characteristics of the semiconductor device during contact with the semiconductor at the curing temperatures of the plastic and at the operating temperatures of the semiconductor.

11. A method as described in claim 4 wherein the plastic is heated during said concentrating operation.

12. A potted semiconductor unit, comprising a body of solid plastic material of low electrical conductivity; a semiconductor device including electrode means connected thereto, embedded in said body; a metal can surrounding said body; and heat-conductive filler particles embedded in said body, at close distances from one another, throughout a zone which constitutes only a limited portion of said body and extends from an outside surface of at least one of the electrode means directly to an inside surface of the can.

13. A unit as described in claim 12 wherein said particles substantially consist of silicon carbide.

14. A unit as described in claim 12 wherein said particles have screen sizes of about 300 to 500.

15. A unit as described in claim 12 wherein the semiconductor device is secured to a stem, the unit comprising in longitudinal alignment: the stem; an integral portion of the body of plastic, relatively free of said particles; and said limited portion of said body, with said particles embedded therein.

16. A unit as described in claim 15 wherein the semiconductor device has lead wire means extending through the integral portion of the body of plastic.

17. A unit as described in claim 12 wherein the semiconductor device is a transistor having a collector electrode and said limited portion of said plastic body containing said filler particles extends from said collector electrode to the can.

18. A unit as described in claim 12 wherein the semiconductor has electrodes of the surface barrier type, in said limited portion of said plastic body.

19. A unit as described in claim 12 wherein the metal can is electrically insulated from the semiconductor device therein.

References Cited in the file of this patent

UNITED STATES PATENTS

| | | |
|---|---|---|
| 1,959,934 | Smith | May 22, 1934 |
| 1,994,534 | Robinson | Mar. 19, 1935 |
| 2,034,434 | Heintz | Mar. 17, 1936 |
| 2,375,058 | Wiegand | May 1, 1945 |
| 2,636,073 | Clarke | Apr. 21, 1953 |
| 2,666,073 | Slade | Jan. 19, 1954 |
| 2,758,261 | Armstrong | Aug. 7, 1956 |

FOREIGN PATENTS

| | | |
|---|---|---|
| 671,473 | Great Britain | Apr. 1, 1949 |
| 742,413 | Great Britain | Dec. 30, 1955 |